(12) United States Patent
Driscoll et al.

(10) Patent No.: US 7,895,128 B2
(45) Date of Patent: Feb. 22, 2011

(54) SELF-TRAINING AND SELF-TESTING SYSTEMS AND METHODS

(75) Inventors: Diane Driscoll, Windsor, CT (US); Kathy Cantwell, Charlotte, NC (US)

(73) Assignee: Xerox Corporation, Norwalk, CT (US)

( * ) Notice: Subject to any disclaimer, the term of this patent is extended or adjusted under 35 U.S.C. 154(b) by 867 days.

(21) Appl. No.: 11/679,567

(22) Filed: Feb. 27, 2007

(65) Prior Publication Data
US 2008/0208779 A1 Aug. 28, 2008

(51) Int. Cl.
G06Q 50/00 (2006.01)
(52) U.S. Cl. ...................... 705/328; 705/326
(58) Field of Classification Search ................ 705/328
See application file for complete search history.

(56) References Cited

U.S. PATENT DOCUMENTS

| | | | | |
|---|---|---|---|---|
| 3,961,597 A * | 6/1976 | Lester et al. | ................. | 116/103 |
| 5,692,206 A * | 11/1997 | Shirley et al. | ................. | 715/256 |
| 6,599,128 B2 * | 7/2003 | Roberts | ................. | 434/128 |
| 6,784,973 B1 * | 8/2004 | Wozniak et al. | ................. | 355/40 |
| 7,080,076 B1 * | 7/2006 | Williamson et al. | ................. | 1/1 |
| 7,385,479 B1 * | 6/2008 | Green et al. | ................. | 340/286.02 |
| 2002/0061507 A1 * | 5/2002 | Kawamura | ................. | 434/379 |
| 2002/0138574 A1 * | 9/2002 | Brown et al. | ................. | 709/204 |
| 2003/0032524 A1 * | 2/2003 | Lamar et al. | ................. | 482/8 |
| 2003/0228560 A1 | 12/2003 | Seat et al. | | |
| 2004/0063085 A1 | 4/2004 | Ivanir et al. | | |
| 2005/0249337 A1 | 11/2005 | Ordille et al. | | |
| 2006/0014126 A1 | 1/2006 | Esposito et al. | | |
| 2006/0228689 A1 | 10/2006 | Rajaram | | |
| 2006/0282823 A1 * | 12/2006 | Li et al. | ................. | 717/121 |
| 2008/0244605 A1 * | 10/2008 | Bennington et al. | ......... | 718/104 |

OTHER PUBLICATIONS http://www.cip4.org/documents/jdf_specifications/JDF_1.3.pdf), pp. 440-441, Dec. 11, 2006.

* cited by examiner

Primary Examiner—Traci L Casler
(74) Attorney, Agent, or Firm—Gibb I.P. Law Firm, LLC

(57) ABSTRACT

Embodiments herein begin by being supplied with input of at least two parties. From this, the embodiments herein automatically generate a contract between the parties, computerized self-training programs, and computerized self-testing programs based on the parties input. Embodiments herein cause employees of a service provider to perform computerized self-training programs directed toward a first phase of the requirements. The embodiments herein also use a computerized self-testing program to determine whether all of the employees of the service provider within a specific group have acquired knowledge that exceeds the first phase of the requirements. Further, these embodiments prevent any employee of the service provider within the specific group from performing computerized self-training programs directed toward a second phase of the requirements until all of the employees of the service provider within the specific group have acquired knowledge that exceeds the first phase of the requirements, as determined by the computerized self-testing program.

7 Claims, 4 Drawing Sheets

FIG. 3A

| VALUE ASSURANCE PROCESS - SITE IMPLEMENTATION PLAN TABLE OF CONTENTS ||||
|---|---|---|---|
| PRE-WORK ||||
| 010 ENGAGE SALES PARTNER | 040 DETERMINE/SCHEDULE TRAINING NEEDS | 109 BEGIN TUTORIAL #1: COMPLETE CONTRACT REVIEW EXERCISE | |
| 020 SELECT SITE FOR DEPLOYMENT | 050 CONDUCT SITE START-UP | 100 COMPLETE TUTORIAL #R1: FALCON SETUP FORMS | |
| 030 COMMUNICATE WITH CUSTOMER ABOUT VAP | 070 DECIDE ON VAP IMPLEMENTATION TIMELINE | 350 COMPLETE TUTORIAL #R2: COMPLETE TECHNICAL SITE READINESS | |
| 300 TUTORIAL #R2: BEGIN TECHNICAL SITE READINESS | 075 DETERMINE FALCON ADOPTION STATUS | 090 COMPLETE 1ST MONTH'S CYCLE COUNT FOR SUPPLIES | |
| | 082 TUTORIAL #R3: COMPLETE SMT TRAINING | | |
| PHASE 1 | PHASE 2 | PHASE 3 ||
| | 111 FINISH TUTORIAL #1: ASSOCIATE UNDERSTANDING OF CUSTOMER SERVICE REQUIREMENTS AND EXPECTATIONS | 203 FINISH TUTORIAL #2: ENSURE CONSISTENT PERFORMANCE: REVIEW AND "LEAN" UP DOCUMENTED PROCESSES | |
| 201 BEGIN TUTORIAL #2: CRITICAL PROCESSES DEFINED | 635 CONTINUE TUTORIAL #3: ASSESS, UPDATE AND SCHEDULE TRAINING NEEDS | 660 COMPLETE TUTORIAL #R3: ASSESS, UPDATE AND SCHEDULE TRAINING NEEDS | |
| 315 CONTINUE TUTORIAL #R3: TRAINING NEEDS IDENTIFIED FOR PRIMARY AND BACK-UP SERVICE PROVIDERS | 217 CONTINUE TUTORIAL #3: ASSOCIATE UNDERSTANDING OF OPENING AND CLOSING AND ASR/FLOATER PROCEDURES | 212 FINISH TUTORIAL #3: ASSOCIATE UNDERSTANDING OF OTHER ADMINISTRATIVE PROCESSES | |
| 210 BEGIN TUTORIAL #3: DOCUMENT ADMINISTRATIVE PROCESSES; IMPLEMENT STANDARD PROTOCOL PROCESSES | | | |

| FROM FIG. 3A | FROM FIG. 3A | FROM FIG. 3A |
|---|---|---|
| 230 BEGIN TUTORIAL #4: BILLABLE ACTIVITIES LIST AND BILLABLE UTILIZATION REPORT | | |
| 240 BEGIN TUTORIAL #5: DEVELOP ALTERNATE PLAN FOR OFFSITE SERVICES | | 242 FINISH TUTORIAL #5: DEVELOP ALTERNATE PLAN FOR SUPPLIES/MATERIALS |
| | | 250 COMPLETE TUTORIAL #6: SITE SECURITY INSPECTIONS ARE PERFORMED |
| 260 BEGIN TUTORIAL #7: 5S, EH&S INSPECTIONS | | 264 COMPLETE TUTORIAL #7: HEALTH & SAFETY TRAINING, MACHINE GUARDING |
| 270 COMPLETE TUTORIAL #8: EMERGENCY PREPAREDNESS PLAN | | |
| | 400 COMPLETE TUTORIALS #9: TRACK AND EVALUATE SOP's, OPERATIONAL PARAMETERS AND VALUE ADDS | |
| | 455 CONTINUE TUTORIAL #10: DOCUMENT ACTION PLAN | 470 FINISH TUTORIAL #10: INCREMENTAL VALUE ADDED |
| 450 BEGIN TUTORIAL #10: CUSTOMER MEETINGS ARE SCHEDULED | | |
| 500 BEGIN TUTORIAL #12: IMPLEMENT CCM PROCESS | 503 CONTINUE TUTORIAL #12: CONTINUE CCM PROCESS | 512 FINISH TUTORIAL #12: COMPLETE CCM PROCESS |
| | 560 BEGIN TUTORIAL #13: CUSTOMER RELATIONSHIP IS UNDERSTOOD | 575 FINISH TUTORIAL #13: CUSTOMER RELATIONSHIP IS STRENGTHENED |
| | 580 BEGIN TUTORIAL #14: METHODS OF COMMUNICATING XEROX SERVICES CAPABILITIES ARE IDENTIFIED | 585 FINISH TUTORIAL #14: METHODS ARE DEVELOPED AND DELIVERED |
| 600 BEGIN TUTORIAL #15: PROBLEM IDENTIFICATION STRATEGY IS ESTABLISHED | 610 CONTINUE TUTORIAL #15: TRACK, ANALYZE AND RESOLVE PROBLEMS | 650 FINISH TUTORIAL #15: MONITOR AND REVIEW PROBLEMS FOR TRENDS |

SELF-TRAINING AND SELF-TESTING SYSTEMS AND METHODS

BACKGROUND

Embodiments herein generally relate to requirement systems and methods, and more particularly comprise a method, system, service, etc. for administering requirements of agreements relating to services, such as copying and printing services, using an automated self-training and self-testing system and process.

When administering agreements, conventional systems focus on process, without a standardized methodology to manage service provider worksites that include people, process, and technology.

SUMMARY

The embodiments herein produce a disciplined approach to continuous improvement. The embodiments integrate people, process, and technology. By having the parties work together, the embodiments herein deliver greater value. The embodiments herein provide a dynamic and disciplined management approach. The embodiments herein also provide a comprehensive understanding of the requirements for every job, documented work processes that are carefully followed, technology to monitor operations and improve performance, consistent site certification standards and regular inspections, a secure, neat and professional service provider work area, conscientious, skilled employees who have the resources to get jobs done efficiently, an enhanced ability to identify and resolve issues before they become problems, and improved communication between the parties. The embodiments herein comprise a day-in, day-out pursuit of excellence that raises the bar on performance. The embodiments herein work to make sure the parties meet the requirements, communicate effectively, and deliver value to the parties.

With embodiments herein, parties to an agreement are able to take individual work sites to the next level. The embodiments implement more efficient processes to achieve better operational results. Certification and regular inspections are provided with embodiments herein (through self-testing programs) on an ongoing basis to determine whether the site continues to meet certification standards (which can be some of the many requirements of the agreements). These tests provide feedback to become a world-class operation. With the training and resources provided herein, the skills of the service provider's employees are regularly updated, for example, to meet certification standards.

Embodiments herein thus comprise a method, system, service, etc. for administering requirements relating to services, such as copying and printing services, using an automated system and process. More specifically, the embodiments herein begin by being supplied with input of at least two parties. From this, the embodiments herein automatically generate a contract between the parties, computerized self-training programs, and computerized self-testing programs based on the parties input. The contract can be any form of contract or agreement (e.g., copying and printing service agreement) that is made between parties (e.g, between the service provider and the service recipient). The agreement has a plurality of requirements of employees of the service provider.

The employees of the service provider can be in one physical location or can be located at different physical geographic locations. However, the embodiments herein are directed to situations where the service provider's employees are located at the workplace of the service recipient (e.g., at the location where the copying and printing services will be performed). The employees are grouped according to corresponding specific physical geographical locations, if the service recipient has different physical geographic locations that the agreement(s) may cover.

The embodiments herein cause the employees of the service provider to perform computerized self-training programs directed toward a first phase of the requirements. The embodiments herein also use a computerized self-testing program to determine whether all of the employees of the service provider within a specific group have acquired knowledge that exceeds the first phase of the requirements. Further, these embodiments prevent any employee of the service provider within the specific group from performing computerized self-training programs directed toward a second phase of the requirements until all of the employees of the service provider within the specific group have acquired knowledge that exceeds the first phase of the requirements, as determined by the computerized self-testing program.

The embodiments repeat the computerized self-training program and the computerized self-testing program for subsequent phases of the requirements. Thus, an employee of the service provider is only allowed to proceed to self-training related to subsequent phases of the requirements after all of the employees of the service provider within the specific group have acquired knowledge that exceeds previous phases of the requirements of the copying and printing service agreement, as determined by the computerized self-testing program. Therefore, with embodiments herein all employees of a specific group receive consistent training and all of the employees of the service provider within the specific group progress through phases of the requirements together as a group. Further, control of progression of the employees of the service provider through the phases of the requirements is completely automated under control of the self-testing program.

Embodiments herein periodically report the status of employees' knowledge to all of the parties to the copying and printing service agreement based exclusively on the computerized self-testing program. In addition, the embodiments can provide warnings to all of the parties to the copying and printing service agreement if the employees of the service provider do not progress through the phases of the requirements within pre-established time limits. This process reports the results of the self-testing to the parties. Further, independent testing of the employees of the service provider, separate from the self-testing program can be performed.

Further embodiments include a process of logging every service transaction performed by the employees of the service provider required by the copying and printing service agreement. These logs can be maintained and reported to each of the parties to the copying and printing service agreement. In other embodiments, to maintain the validity of the system and prevent tampering by the employees, the self-testing can be made secret to the employees of the service provider and be made to appear to the employees of the service provider to be part of the self-training programs. With these embodiments, the manner in which the employees interact with the self-training programs serves as the basis of the self-testing program.

These and other features are described in, or are apparent from, the following detailed description.

BRIEF DESCRIPTION OF THE DRAWINGS

Various exemplary embodiments of the systems and methods are described in detail below, with reference to the attached drawing figures, in which:

FIGS. 3A-3B are schematic representations of different training phases.

DETAILED DESCRIPTION

Figure 1:
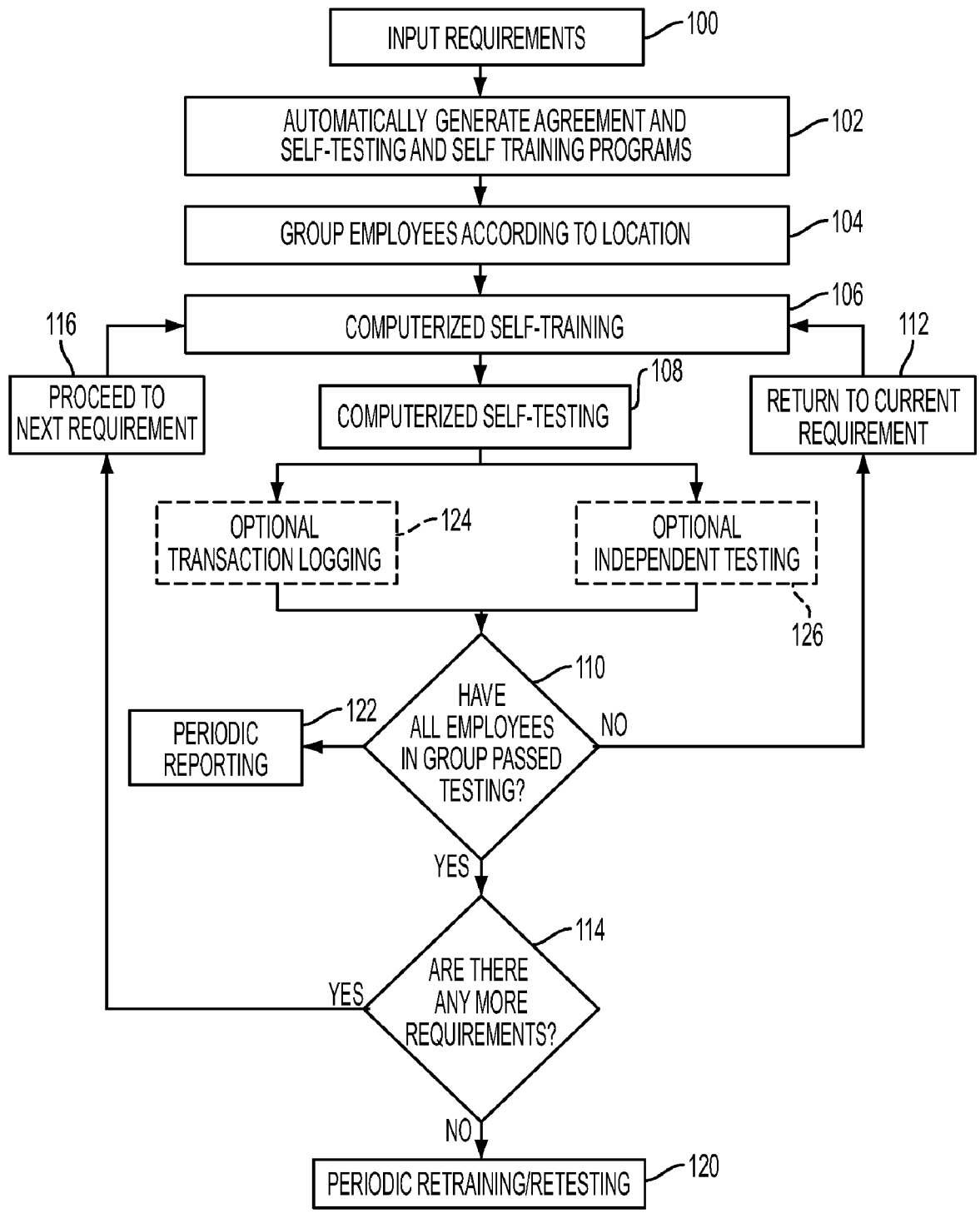
FIG. 1 is a flow diagram illustrating embodiments herein.

Embodiments herein comprise a method, system, service, etc. for administering requirements relating to services, such as copying and printing services, using an automated system and process. More specifically, as shown in the flowchart in FIG. 1, the embodiments herein begin in item 100 by being supplied with input of at least two parties (e.g., the agreed requirements of the parties). From this, the embodiments herein automatically generate a contract between the parties, computerized self-training programs, and computerized self-testing programs based on the parties input, as shown in item 102. The contract can be any form of contract or agreement (e.g., copying and printing service agreement) that is made between parties (e.g, between the service provider and the service recipient). The agreement has a plurality of requirements of employees of the service provider.

The embodiments herein generate the agreement and self-training/self-testing programs by matching standardized contractual clauses and standardized training/testing modules to the parties' requirements. Each of the standardized clauses that matches one or more of parties requirements is included within the agreement and corresponding training and testing modules are added to the self-training and self-testing programs. Therefore, the automatic generation of the agreement and the training/testing programs is driven by the requirements to which the parties have agreed. In addition, the self-training and self-testing programs may include generic educational aspects that are not specifically directed to any particular contractual requirement, but instead are useful toward achieving the parties overall goals and desires. Similarly, the contract can include generic clauses. Also, after the automatic generation of the agreement, embodiments herein allow modification of the agreement to suite specific instances and these embodiments allow custom training/testing modules to be added to the self-training and self-testing programs if any of the parties deem such necessary.

The employees of the service provider can be in one physical location or can be located at different physical geographic locations. However, the embodiments herein are directed to situations where the service provider's employees are located at the workplace of the service recipient (e.g., at the location where the copying and printing services will be performed). In item 104, the employees are grouped according to corresponding specific physical geographical locations, if the service recipient has different physical geographic locations that the agreement(s) may cover.

The embodiments herein cause the employees of the service provider to perform aspects of the computerized self-training programs that are directed toward a first phase of the requirements in item 106. The embodiments herein also use the previously generated computerized self-testing program to determine whether all of the employees of the service provider within a specific group have acquired knowledge that exceeds the first phase of the requirements in item 108.

Further, the embodiments herein prevent any employee of the service provider within the specific group from performing computerized self-training programs directed toward a second phase of the requirements until all of the employees of the service provider within the specific group have acquired knowledge that exceeds the first phase of the requirements, as determined by the computerized self-testing program. Thus, as shown in decision box 110, if all the employees of the group have not passed the testing, processing proceeds to item 112 which returns the employees to the current (e.g., first) requirement and repeats the computerized self-training 106 and self-testing 108 on the current requirement. To the contrary, when all employees in the group have passed the testing (if there are more requirements, as determined by decision box 114) processing proceeds to item 116 which performs the computerized self-training 106 and self-testing 108 on the next requirement (e.g., second or subsequent requirements).

The embodiments repeat the computerized self-training program and the computerized self-testing program for subsequent phases of the requirements as shown by the self-testing. Thus, an employee of the service provider is only allowed to proceed to self-training related to subsequent phases of the requirements after all of the employees of the service provider within the specific group have acquired knowledge that exceeds previous phases of the requirements of the copying and printing service agreement, as determined by the computerized self-testing program. Therefore, with embodiments herein all employees of a specific group receive consistent training and all of the employees of the service provider within the specific group progress through phases of the requirements together as a group. Further, control of progression of the employees of the service provider through the phases of the requirements is completely automated under control of the self-testing program. Once all training/testing has been completed for all requirements (item 114) the embodiments can periodically perform refresher retraining and retesting in item 120 or new requirements can be added for training/testing.

Embodiments herein periodically report the status of employees' knowledge to all of the parties to the copying and printing service agreement based exclusively on the computerized self-testing program, as shown in item 122. In addition, the reporting 122 can provide warnings to all of the parties to the copying and printing service agreement if the employees of the service provider do not progress through the phases of the requirements within pre-established time limits. This process of periodically reporting 122 can report the results of the self-testing to the parties to the copying and printing service agreement. Further, independent testing of the employees of the service provider, separate from the self-testing program, can be performed as shown by item 126.

Further embodiments include a process of logging every service transaction performed by the employees of the service provider required by the copying and printing service agreement 124. These logs can be maintained and reported to each of the parties to the copying and printing service agreement in item 122.

In other embodiments, to maintain the validity of the system and prevent tampering by the employees, the self-testing 108 can be made secret to the employees of the service provider and be made to appear to the employees of the service provider to be part of the self-training programs. With these embodiments, the manner in which the employees interact with the self-training programs serves as the basis of the self-testing program.

Figure 2:
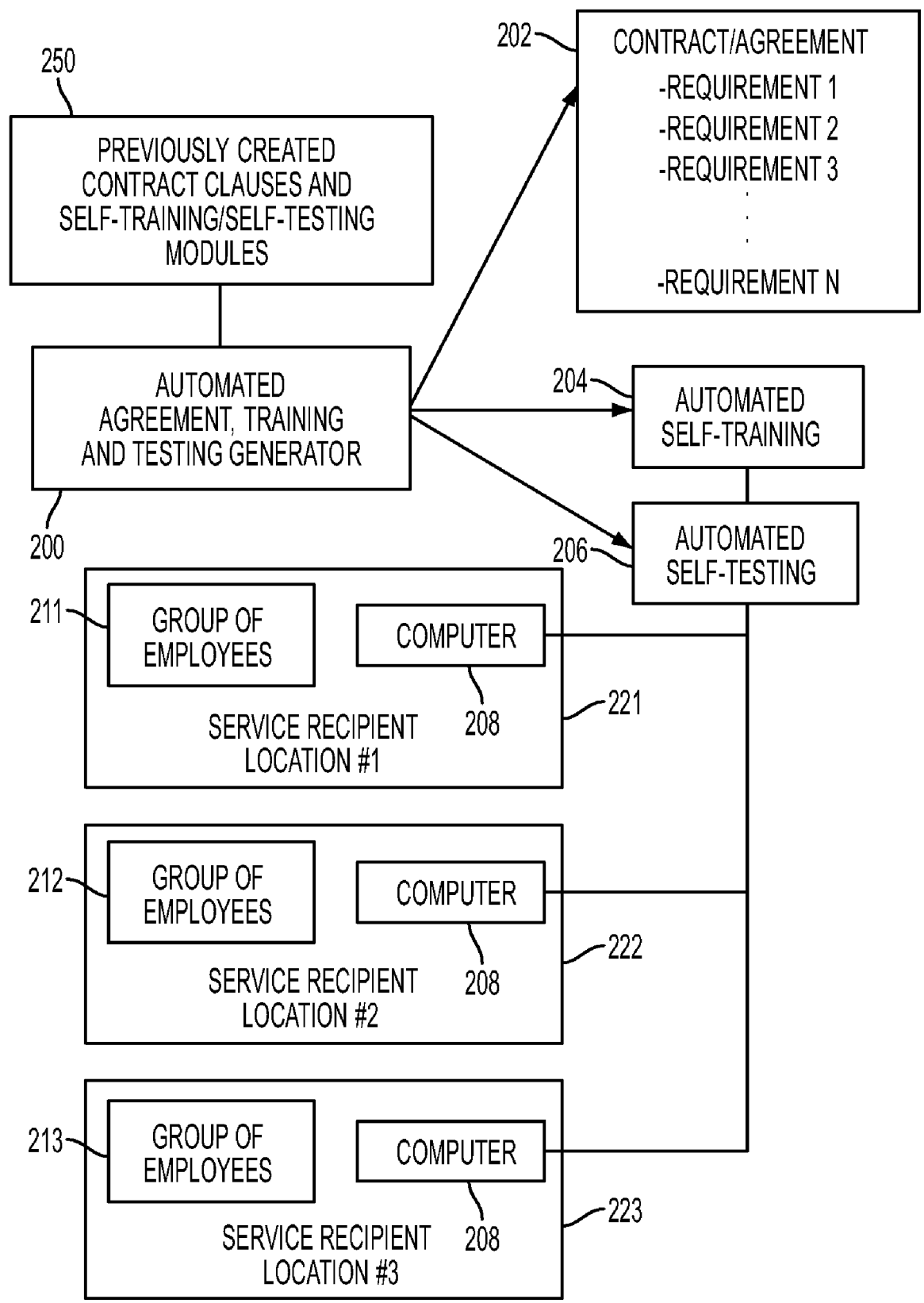
FIG. 2 is a schematic representation of embodiments herein.

FIG. 2 is a schematic diagram that illustrates aspects of embodiments herein. As discussed above, the embodiments herein generate the agreement and self-training/self-testing programs by matching standardized contractual clauses and standardized training/testing modules to the parties' requirements. Therefore, FIG. 2 illustrates an automated agreement, training, and testing generator 200 that generates the contract/agreement 202 (that includes many requirements), generates the automated self-training program 204, and generates the automated self-testing program 206.

The generator 200 has access to a database of previously created and stored contractual clauses, self-training modules, and self-testing modules 250. The generator 200 matches ones of the previously created, standardized clauses to the parties' requirements and combines such standardized clauses into a contract (or adds such clauses to a shell contract in, for example, a merge document). For example, the parties can be given a list of standard requirements from which they can select their requirements. By controlling which clauses the parties can specify, the embodiments herein ensure that a corresponding clause and training/testing module will be available in the database 250. However, as mentioned above, the embodiments herein also allow the parties to specify non-standard contractual clauses and non-standard training/testing modules that the parties themselves create and add to the contract 202, and automated self-training/self-testing programs 204/206. Similarly, the parties can alter the contract 202 and automated self-training/self-testing programs 204/206 that is generated by the generator 200.

For each clause (or group of clauses) added to the contract 202, corresponding training and testing modules are added to the self-training and self-testing programs 204, 206. Therefore, the automatic generation of the agreement and the training/testing programs is driven by the requirements to which the parties have agreed. In addition, the self-training and self-testing programs 204, 206 may include generic educational aspects that are not specifically directed to any particular contractual requirement, but instead are useful toward achieving the parties overall goals and desires. Similarly, the contract 202 can include generic clauses. Also, after the automatic generation of the agreement 202, embodiments herein allow modification of the agreement 202 to suite specific instances and these embodiments allow custom training/testing modules to be added to the self-training and self-testing programs 204, 206 if any of the parties deem such necessary.

In FIG. 2, the contract or agreement 202 can be, for example, a copying and printing service agreement that is made between parties (e.g, between the service provider and the service recipient). The copying and printing service agreement 202 can have a plurality of requirements (1, 2, 3, . . . N) of employees of the service provider.

The employees 211-213 of the service provider can be in one physical location 221 or can be located at different physical geographic locations 221-223. However, the embodiments herein are directed to situations where the service provider's employees 211-213 are located at the workplace of the service recipient (e.g., at the location where the copying and printing services will be performed) 221-223. The employees 211-213 are grouped according to corresponding specific physical geographical locations 221-223, if the service recipient has different physical geographic locations that the agreement(s) may cover.

The embodiments herein cause the employees 211-213 of the service provider to perform the computerized self-training programs 204 directed toward a first phase of the requirements. The embodiments herein also use the computerized self-testing program 206 to determine whether all of the employees 211-213 of the service provider within a specific group have acquired knowledge that exceeds the first phase of the requirements. Further, these embodiments prevent any employee of the service provider within the specific group from performing computerized self-training programs directed toward a second phase of the requirements until all of the employees 211-213 of the service provider within the specific group have acquired knowledge that exceeds the first phase of the requirements, as determined by the computerized self-testing program 206.

The embodiments repeat the computerized self-training program 204 and the computerized self-testing program 206 for subsequent phases of the requirements. Thus, an employee of the service provider is only allowed to proceed to self-training related to subsequent phases of the requirements until all of the employees 211-213 of the service provider within the specific group have acquired knowledge that exceeds previous phases of the requirements of the copying and printing service agreement 202, as determined by the computerized self-testing program 206. Therefore, with embodiments herein all employees 211-213 of a specific group receive consistent training and all of the employees 211-213 of the service provider within the specific group progress through phases of the requirements together as a group. Further, control of progression of the employees 211-213 of the service provider through the phases of the requirements is completely automated under control of the self-testing program 206.

In other embodiments, to maintain the validity of the system and prevent tampering by the employees 211-213, the self-testing can be made secret to the employees 211-213 of the service provider and be made to appear to the employees 211-213 of the service provider to be part of the self-training programs. With these embodiments, the manner in which the employees 211-213 interact with the self-training programs serves as the basis of the self-testing program.

FIGS. 3A-3B are schematic diagrams that illustrate a number of self-training tutorials divided into a pre-work phase and phases 1-3. The self-training program 204 administers such tutorials and the self-testing program 206 provides testing on such tutorials.

Thus, as described above, the embodiments herein produce a disciplined approach to continuous improvement. The embodiments integrate people, process, and technology. By having the parties work together, the embodiments herein deliver greater value. The embodiments herein provide a dynamic and disciplined management approach. The embodiments herein also provide a comprehensive understanding of the requirements for every job, documented work processes that are carefully followed, technology to monitor operations and improve performance, consistent site certification standards and regular inspections, a secure, neat and professional service provider work area, conscientious, skilled employees who have the resources to get jobs done efficiently, an enhanced ability to identify and resolve issues before they become problems, and improved communication between the parties. The embodiments herein comprise a day-in, day-out pursuit of excellence that raises the bar on performance. The embodiments herein work to make sure the parties meet the requirements, communicate effectively, and deliver value to the parties.

With embodiments herein, parties to an agreement are able to take individual work sites to the next level. The embodiments implement more efficient processes to achieve better operational results. Certification and regular inspections are provided with embodiments herein (through the self-testing programs) on an ongoing basis to determine whether the site continues to meet certification standards (which can be some of the many requirements of the agreements). These tests provide feedback to produce a world-class operation. With the training and resources provided herein, the skills of the service provider's employees are regularly updated, for example, to meet certification standards.

The disclosed embodiments provide all the resources needed to ensure a site team operates at peak performance. The testing programs described herein provide an information management system to log the details of every service transaction performed. This helps the site team meet not only deadlines, but every requirement of every job. The information management system can capture the details of every service transaction to help red flag issues before they turn into problems. This also generates detailed, performance-based reports to help fine-tune the processes, optimize resource usage, and facilitate good decision-making.

The word "printer" as used herein encompasses any apparatus, such as a digital copier, bookmaking machine, facsimile machine, multi-function machine, etc. which performs a print outputting function for any purpose. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof.

What is claimed is:

1. A computer-implemented method comprising:
   supplying input of at least two parties to a computer;
   using said computer, automatically generating a copying and printing service agreement between said parties, computerized self-training programs, and computerized self-testing programs based on said input, said copying and printing service agreement having a plurality of requirements of employees of a service provider party of said parties, and all of said employees of said service provider being within a single physical geographic location of a service recipient party of said parties where copying and printing services will be performed;
   using said computer, causing said employees of said service provider to perform said computerized self-training programs directed toward a first phase of said requirements;
   using said computer and said computerized self-testing program to determine whether all of said employees of said service provider at said single physical geographic location have acquired knowledge that exceeds said first phase of said requirements;
   using said computer, preventing any employee of said service provider at said single physical geographic location from performing computerized self-training programs directed toward a second phase of said requirements until all of said employees of said service provider at said single physical geographic location have acquired knowledge that exceeds said first phase of said requirements, as determined by said computerized self-testing program;
   using said computer, repeating said computerized self-training program and said computerized self-testing program for subsequent phases of said requirements, such that an employee of said service provider is only allowed to proceed to self-training related to subsequent phases of said requirements after all of said employees of said service provider at said single physical geographic location have acquired knowledge that exceeds previous phases of said requirements of said copying and printing service agreement, as determined by said computerized self-testing program, such that all of said employees of said service provider at said single physical geographic location progress through phases of said requirements together, and control of progression of said employees of said service provider through said phases of said requirements is completely automated; and
   using said computer, periodically reporting a status of knowledge of said employees of said service provider to all of said parties to said copying and printing service agreement based exclusively on said computerized self-testing program; and
   using said computer, providing warnings to all of said parties to said copying and printing service agreement if said employees of said service provider do not progress through said phases of said requirements within pre-established time limits.

2. The method according to claim 1, in which said periodically reporting comprises reporting said results of said self-testing to said parties to said copying and printing service agreement.

3. The method according to claim 1, further comprising performing independent testing of said employees of said service provider, separate from said self-testing program.

4. The method according to claim 1, further comprising logging every service transaction performed by said employees of said service provider required by said copying and printing service agreement.

5. The method according to claim 4, further comprising reporting each said service transaction to said parties to said copying and printing service agreement.

6. The method according to claim 1, in which said self-testing is secret to said employees of said service provider and appears to said employees of said service provider to be part of said self-training programs.

7. The method according to claim 1, in which said periodically reporting comprises reporting at least once a day.

* * * * *